United States Patent
Park

(10) Patent No.: US 8,545,075 B2
(45) Date of Patent: Oct. 1, 2013

(54) BACKLIGHT UNIT AND LIQUID CRYSTAL DISPLAY APPARATUS INCLUDING THE SAME

(75) Inventor: Jun Seok Park, Gwangju (KR)

(73) Assignee: LG Innotek Co., Ltd., Seoul (KR)

( * ) Notice: Subject to any disclaimer, the term of this patent is extended or adjusted under 35 U.S.C. 154(b) by 276 days.

(21) Appl. No.: 12/067,032

(22) PCT Filed: Aug. 17, 2007

(86) PCT No.: PCT/KR2007/003930
§ 371 (c)(1),
(2), (4) Date: Mar. 14, 2008

(87) PCT Pub. No.: WO2008/026841
PCT Pub. Date: Mar. 6, 2008

(65) Prior Publication Data
US 2008/0219003 A1   Sep. 11, 2008

(30) Foreign Application Priority Data
Aug. 29, 2006 (KR) .................. 10 2006 0082044

(51) Int. Cl.
*F21V 7/04* (2006.01)

(52) U.S. Cl.
USPC ............... 362/555; 362/26; 362/27; 362/600; 362/603; 362/609

(58) Field of Classification Search
USPC ............... 362/555, 26, 27, 600, 603, 609, 612
See application file for complete search history.

(56) References Cited

U.S. PATENT DOCUMENTS

| 5,128,787 | A | * | 7/1992 | Blonder | 349/113 |
|---|---|---|---|---|---|
| 6,069,676 | A | | 5/2000 | Yuyama | |
| 6,106,137 | A | * | 8/2000 | Adams et al. | 362/237 |
| 6,923,548 | B2 | | 8/2005 | Lim | |
| 7,375,381 | B2 | | 5/2008 | Shimizu et al. | |
| 7,510,291 | B2 | | 3/2009 | Song et al. | |
| 7,556,412 | B2 | * | 7/2009 | Guillermo | 362/556 |
| 7,639,901 | B2 | * | 12/2009 | Lianza | 385/12 |
| 7,839,091 | B2 | | 11/2010 | Kohashikawa et al. | |
| 2002/0071288 | A1 | | 6/2002 | Lim | |
| 2002/0185651 | A1 | * | 12/2002 | Sommers | 257/94 |
| 2004/0113044 | A1 | | 6/2004 | Ishiguchi | |
| 2004/0214556 | A1 | | 10/2004 | Yamada | |
| 2005/0269868 | A1 | | 12/2005 | Kawai et al. | |
| 2006/0160409 | A1 | * | 7/2006 | Shimizu et al. | 439/490 |
| 2006/0164840 | A1 | | 7/2006 | Song et al. | |
| 2006/0221574 | A1 | * | 10/2006 | Song et al. | 361/704 |

(Continued)

FOREIGN PATENT DOCUMENTS

| JP | 10-49074 A | 2/1998 |
|---|---|---|
| JP | 2002-334031 A | 11/2002 |

(Continued)

*Primary Examiner* — Jong-Suk (James) Lee
*Assistant Examiner* — Mark Tsidulko
(74) *Attorney, Agent, or Firm* — Birch, Stewart, Kolasch & Birch, LLP

(57) ABSTRACT

Provided are a backlight unit and a liquid crystal display apparatus including the same. The backlight unit comprises: a housing comprising an opening part; a module substrate in the opening part of the housing; a light emitting diode on the module substrate; and a reflection sheet in which the light emitting diode inserted thereto.

12 Claims, 4 Drawing Sheets

(56) References Cited

U.S. PATENT DOCUMENTS

| | | | |
|---|---|---|---|
| 2007/0002590 A1* | 1/2007 | Jang et al. | 362/633 |
| 2007/0014098 A1* | 1/2007 | Park et al. | 362/29 |
| 2007/0030697 A1* | 2/2007 | Kim | 362/618 |
| 2007/0047220 A1* | 3/2007 | Kang et al. | 362/97 |
| 2007/0189024 A1* | 8/2007 | Nanbu et al. | 362/458 |
| 2007/0220824 A1* | 9/2007 | Hasegawa et al. | 52/506.05 |
| 2007/0230210 A1* | 10/2007 | Tsai et al. | 362/600 |

FOREIGN PATENT DOCUMENTS

| | | |
|---|---|---|
| JP | 2003-207780 A | 7/2003 |
| JP | 2004-273175 A | 9/2004 |
| JP | 2005-38643 A | 2/2005 |
| JP | 2005-71702 A | 3/2005 |
| JP | 2005-344801 A | 12/2005 |
| JP | 2006-202725 A | 8/2006 |
| JP | 2006-209120 A | 8/2006 |
| JP | 2007-148177 A | 6/2007 |
| KR | 10-2004-0053750 A | 6/2004 |
| KR | 10-2005-0020667 A | 3/2005 |
| KR | 10-2006-0024529 A | 3/2006 |
| KR | 10-2006-0084026 A | 7/2006 |
| KR | 10-2006-0085401 A | 7/2006 |
| TW | 567619 | 12/2003 |

* cited by examiner

BACKLIGHT UNIT AND LIQUID CRYSTAL DISPLAY APPARATUS INCLUDING THE SAME

TECHNICAL FIELD

Embodiments relate to a backlight unit and a liquid crystal display apparatus including the same.

BACKGROUND ART

Examples of a display device are a cathode ray tube (CRT), a liquid crystal display (LCD) using an electro-optic effect, a plasma display panel (PDP) using a gas discharge effect, and an electro luminescence displays (ELD) using an electroluminescent effect. Among them, research on the LCD apparatus is conducted more actively.

The LCD apparatus is a light receiving device that adjusts an amount of light transmitted from the outside in order to display an image, and also requires an additional external light source such as a backlight unit.

The backlight unit utilizes a light emitting lamp such as a cold cathode florescent lamp (CCFL), and a light emitting diode (LED).

DISCLOSURE

Technical Problem

Embodiments provide a backlight unit capable of increasing an amount of reflected light by providing a reflection sheet where LEDs of an LED module substrate are inserted, and an LCD apparatus including the same.

Embodiments provide a backlight unit capable of improving the uniformity of brightness and color by slanting the side surface of an LED insertion hole in a reflection sheet, and an LCD apparatus including the same.

Embodiments provide a backlight unit capable of adjusting light intensity by providing a plurality of optical receiving sensors on a reflection sheet between LEDs, and an LCD apparatus including the same.

Technical Solution

An embodiment provides a backlight unit, comprising: a housing comprising an opening part; a module substrate in the opening part of the housing; a light emitting diode on the module substrate; and a reflection sheet in which the light emitting diode inserted thereto.

An embodiment provides a backlight unit, comprising: a housing comprising an opening part; a module substrate in the opening part of the housing; a light emitting diode on the module substrate; a reflection sheet in which the light emitting diode on the module substrate inserted; and a plurality of optical receiving parts on the reflection sheet thereto.

An embodiment provides a liquid crystal display apparatus, comprising: a liquid crystal panel; and a light unit below the liquid crystal panel. The light unit comprises: a housing comprising an opening part; a module substrate in the housing; a light emitting diode on the module substrate; and a reflection sheet in which the light emitting diode on the module substrate inserted thereto.

Advantageous Effects

According to the backlight unit and the LCD apparatus including the same, an amount of reflected light may be increased by the LEDs partially penetrating the reflection sheet on the module substrate.

Moreover, since the LEDs are disposed on the middles of the diode insertion holes, respectively, brightness and color uniformity about light emitted from the backlight unit can be improved.

Additionally, the optical receiving component is disposed on the reflection sheet, such that light intensity at each color can be controlled to improve mixed color light.

BEST MODE

Reference will now be made in detail to the embodiments of the present disclosure, examples of which are illustrated in the accompanying drawings.

Figure 1:
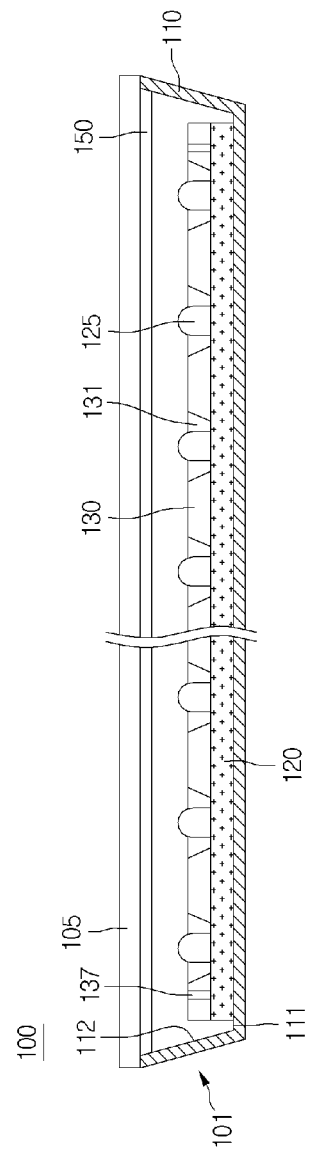
FIG. 1 is a sectional view of an LCD apparatus according to an embodiment.

FIG. 1 is a sectional view of an LCD apparatus according to an embodiment. Referring to FIG. 1, a liquid crystal display (LCD) apparatus (100) includes a light unit 101 and a liquid crystal panel 105.

The light unit 101 provides light to a lighting apparatus or a display apparatus. The light unit 101 is disposed below the liquid crystal panel 105 to radiate necessary light for the liquid crystal panel 105.

The light unit 101 includes a housing 110, a module substrate 120, a reflection sheet 130, and an optical sheet part 150. An opening part 111 is formed on the housing 110, and at least one LED module substrate is received in the opening. The side part side 112 of the housing 110 has a slant structure serving as a reflection plate.

A plurality of light emitting diodes (LEDs) are mounted on the module substrate 120. The reflection sheet 130 is disposed on the module substrate 120. A diode insertion hole 131 is formed in the reflection sheet 130, and the LEDs 125 are inserted into the diode insertion holes 131. The inserted LEDs 125 may pass through the diode insertion holes 131 of the reflection sheet 130. the diode insertion holes 131 may pass through into which the LEDs 125 are inserted. According to the insertion number or the size of the LEDs 125, and a form, the diode insertion holes 131 can be variously formed. The optical sheet part 150 may include at least one optical sheet. The optical sheet part 150 includes a diffusion sheet (not shown) and a prism sheet (not shown). The diffusion sheet diffuses incident light in order to improve uniformity for light that passes through the diffusion sheet. The prism sheet includes a horizontal prism sheet and a vertical prism sheet to refract and collect the incident light, thereby improving brightness in the surface of a backlight unit. This prism sheet may further include a luminance intensifying film (not shown). According to an embodiment, the optical sheet part may be removed.

The liquid crystal panel 105 displays an image corresponding to an inputted image signal by using light provided from the light unit 101. This liquid crystal panel 105 includes a color filter substrate facing to a thin film transistor (TFT) substrate, a liquid crystal layer adjusting light transmittance according to an electric field between the TFT substrate and the color filter substrate, and a spacer maintaining a cell gap between a first substrate and a second substrate. A polarizer may be provided on both sides of the liquid crystal panel, respectively. According to an embodiment, a liquid crystal panel is not limited to the above liquid crystal panel.

Figure 2:
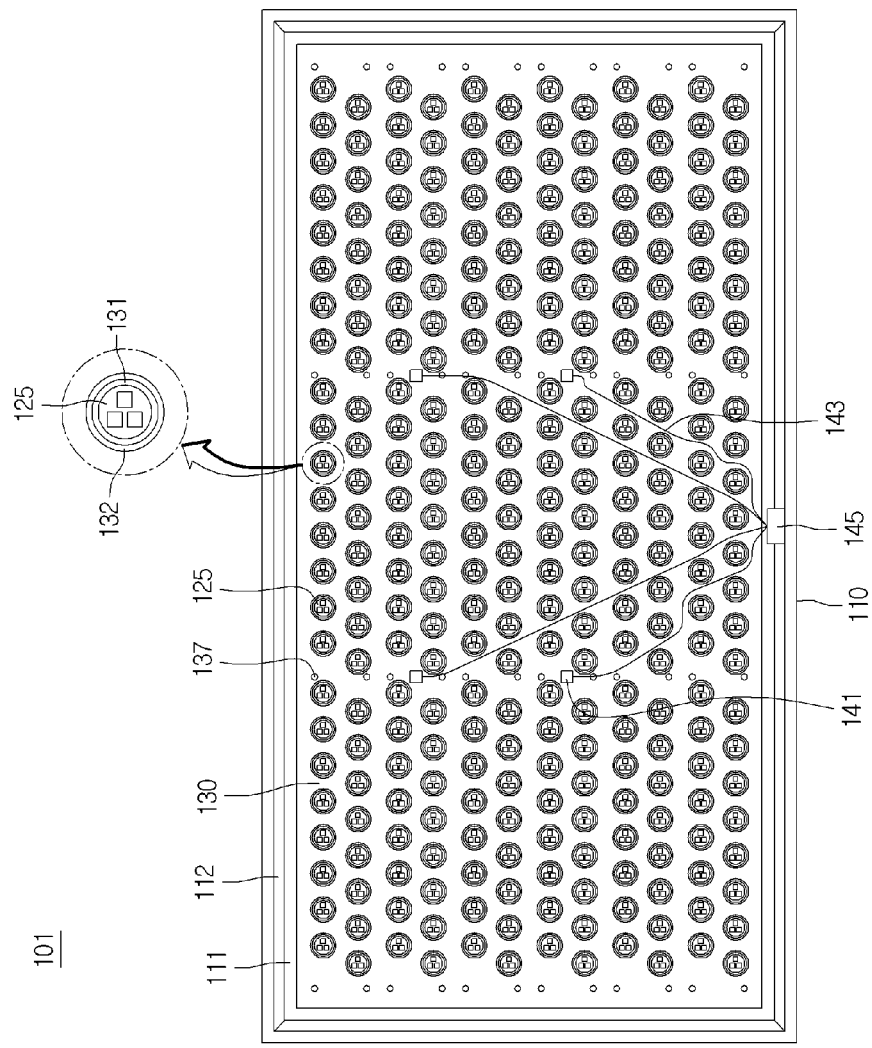
FIG. 2 is a plan view of a light unit without a reflection sheet of FIG. 1.

FIG. 2 is a plan view of a light unit without the reflection sheet of FIG. 1. The light unit has a structure in which the optical sheet part is removed.

Referring to FIGS. 1 and 2, the module substrate 120 is disposed on the opening part 111 of the housing 110, and the LEDs 125 are mounted on the module substrate 120. The LEDs 125 are arranged in at least one column, and when being arranged in a plurality of columns, the LEDs in adjacent columns may be mounted in zigzag.

When the reflection sheet 130 is disposed on the module substrate 120, the LEDs 125 are inserted through the diode insertions holes, respectively, and the inserted LEDs 125 may pass through the diode insertion holes 125 of the reflection sheet 130. Here, the LEDs 125 may be respectively arranged on the middles of the diode insertion holes 131. The reflection sheet 130 may be formed of a metal material such as aluminum with a high reflectivity, or the surface of the reflection sheet 130 and the side surface 132 of the diode insertion hole 131 may be coated with a reflecting material. The reflectivity of the reflection sheet may be over 90%.

The side surface 132 of the diode insertion hole 131 may be formed of a slant surface. That is, the top diameter is greater than the bottom diameter in the diode insertion hole 131.

At least one optical receiving part 141 is disposed on the reflection sheet 130. The optical receiving part 141 is an optical fiber with a predetermined area, which has a broad opening part for detecting light from the LEDs 125.

The positions where the optical receiving part 141 is installed may be the middle, arouhd the middle, and each corner of the reflection sheet 130. Additionally, the number of the optical receiving parts 141 and their positions may vary according to the size of the backlight unit.

Transmission lines 143 are respectively connected to the optical receiving parts 141, and also may be formed of an optical fiber. The transmission lines 143 transmit light incident to the optical receiving part 141 and the transmission lines 143 into a color receiving sensor 145.

The color receiving sensor 145 detects the light transmitted through the transmission lines 143 as electric signals, and provides the detected signals as information for controlling a driving current of the LED chip at each color. For example, light intensities of a red LED chip, a green LED chip, and a blue LED chips are respectively detected, such that a driving current of each LED chip is controlled to improve a mixed color light into a uniform light intensity.

Additionally, a plurality of screw holes 137 are formed in the reflection sheet 130. The reflection sheet 130 is attached to the module substrate 120 or the housing 110 through screws (not shown) and the screw insertion holes 137, in order to fix the reflection sheet 130. At this point, a partial floating of the reflection sheet 130 can be prevented, such that deterioration in brightness and color uniformity due to a floating region of the reflection sheet 130 can be also avoided.

A head portion of the screw (not shown) may be painted with white color, such that its reflectivity may be over 70%. Here, according to an embodiment, the screw is used for fixing the reflection sheet, but another fixing means or adhesive means may be utilized for fixing.

Figure 3:
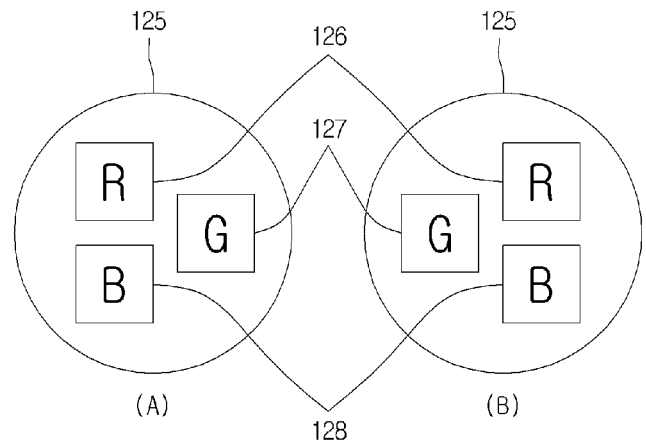
FIG. 3 is a view of an LED chip arrangement in an LED of FIG. 1.

FIG. 3 is a view of an LED chip arrangement in an LED of FIG. 1.

Referring to (A) of FIG. 3, the LED 125 has a red LED chip 126, a green LED chip 127, and a blue LED chip 128, which are arranged in a triangle structure with a clockwise rotation. Referring to (B) of FIG. 3, the LED 125 has the red LED chip 126, the blue LED chip 128, and the green LED chip 127, which are arranged in a triangle structure with a clockwise rotation. Arrangements of the red, green, and blue LED chips 126, 127, and 128 may vary, and are not limited to the above arrangement.

Moreover, the LEDs 125 may be realized with the red, green, and blue LED chips 126, 127, and 128, or with at least one blue LED and a fluorescent substance. LEDs of an embodiment are not limited to the above LEDs 125.

Figure 4:
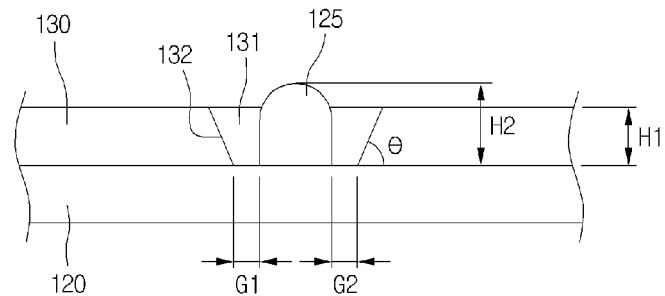
FIG. 4 is a sectional view of an LED coupled to a diode insertion hole in a reflection sheet according to an embodiment.
Figure 5:
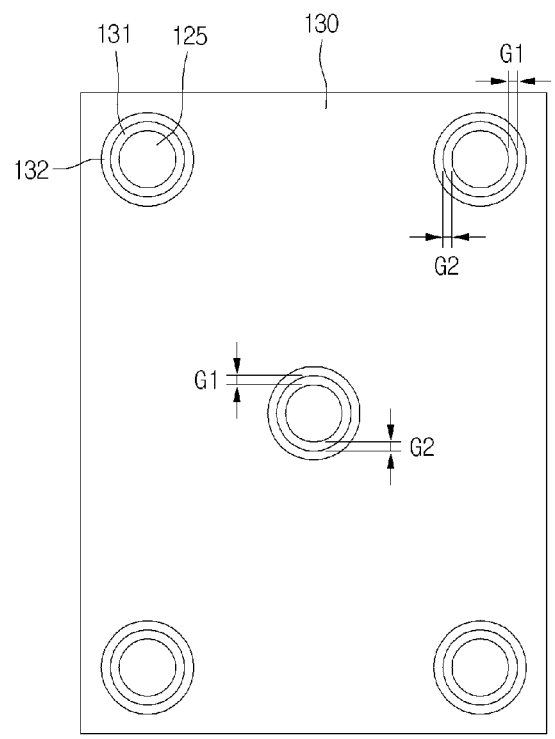
FIG. 5 is a plan view of an LED coupled to a diode insertion hole in a reflection sheet according to an embodiment.

FIG. 4 is a sectional view of an LED coupled to a diode insertion hole in a reflection sheet according to an embodiment. FIG. 5 is a plan view of an LED coupled to a diode insertion hole in a reflection sheet according to an embodiment.

Referring to FIG. 4, the diode insertion hole 131 of the reflection sheet 130 has a side surface 132, and the side surface 132 has a slant side surface widening from the bottom to the top around the LED 125, such that light can be easily reflected. The top portion of the at least one of the plurality of LEDs 125 is formed in a hemisphere shape.

At this point, a tilt angle of the side surface 132 may be 20 to 80° with reference to the bottom surface of the reflection sheet 130.

Additionally, since the LEDs 125 are disposed on the middle of the diode insertion hole 131 in the reflection sheet 130, a distance G1 and G2 between the bottom of the diode insertion hole 131 and the bottom of the LED 125 can become identical. Accordingly, since the light emitted from the LED 125 is uniformly reflected at the side surface 132 of the diode insertion hole 131 of the reflection sheet 130, an amount of reflected light biased to one direction at the side surface 132 can be reduced.

Tolerance of a distance between the bottom of the LED 125 and the diode insertion hole 131 of the reflection sheet 130 may be 0<tolerance≤0.1 mm. For maintaining this tolerance, a molding process is repeatedly performed while manufacturing the LEDs 125, such that a mold structure of the LEDs 125 may be uniformly formed with a hemispheric shape.

Additionally, the height H1 of the reflection sheet 130 may be 50 to 90% of the height H2 of the LEDs 125, such that a partial of light emitted from the LEDs 125 may be effectively reflected again through the surface of the reflection sheet 130 and the side surface 132.

Moreover, since the distance G1 and G2 between the LED 125 and the diode insertion hole 131 of the reflection sheet 130 are almost the same, light emitted from the LEDs 125 may be uniformly reflected at the side surface 132 of the diode insertion hole 131 in the reflection sheet 130.

Figure 6:
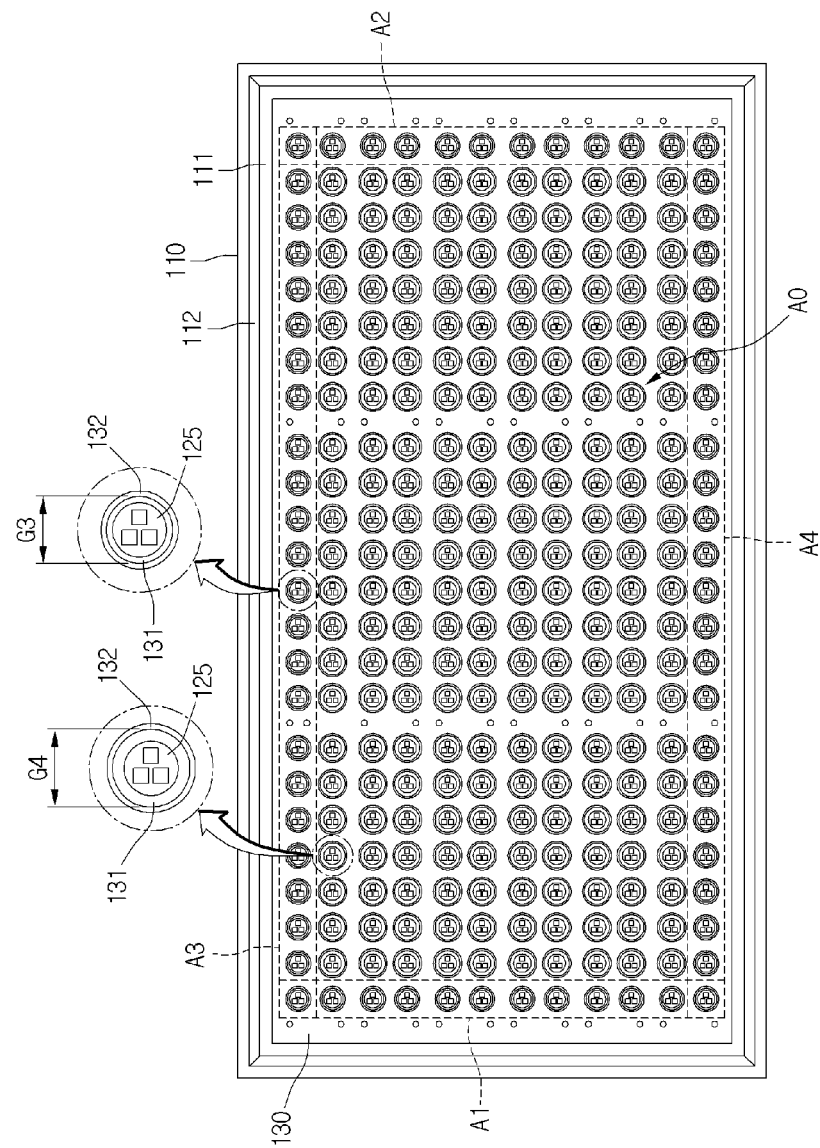
FIG. 6 is a view of a modified diode insertion hole of a reflection sheet in a light unit according to an embodiment.

FIG. 6 is a view of a modified diode insertion hole of a reflection sheet in a light unit according to an embodiment.

Referring to FIG. 6, the size of the diode insertion hole 131 of the reflection sheet 130 may vary according to a region. For example, the bottom diameter G4 of the diode insertion hole 131 at the middle region A0 of the reflection sheet 130 may be larger than the bottom diameter G3 of the diode insertion hole 131 at outer regions A1, A2, A3, and A4.

Here, the minimum tolerances of a distance between the diode insertion hole 131 and the LED 125 in the outer regions A1, A2, A3, and A4 of the reflection sheet 130 may be below 0.1 mm. This centers the LEDs 125 in the diode insertion holes 131 of the outer regions A1, A2, A3, and A4 with reference to the outer regions A1, A2, A3, and A4 of the reflection sheet 130. Therefore, the LEDs 125 are automatically centered in the diode insertion holes 131 in the other region A0.

Also, the outer regions A1, A2, A3, and A4 of the reflection sheet 130 include at least one of a left region A1, a right region A2, an upper region A3, and a lower region A4 in the reflection sheet 130.

Additionally, a tilt angle of the side surface 132 in the middle region A0 may be different from those of the outer regions A1, A2, A3, and A4.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

According to the backlight unit and the LCD apparatus including the same, an amount of reflected light may be increased by the LEDs partially penetrating the reflection sheet. Moreover, since the LEDs are disposed on the middles of the diode insertion holes, respectively, brightness and color uniformity about light emitted from the backlight unit can be improved.

Additionally, the optical receiving component is disposed on the reflection sheet, such that light intensity at each color can be controlled to improve mixed color light. Furthermore, since exposing portions of the screws fixing the reflection sheet are painted with white color, the reflectivity of the screws increases.

The invention claimed is:

1. A backlight unit, comprising:
   a housing;
   a substrate formed in a single piece on the housing;
   a plurality of light emitting diodes on the substrate;
   a reflection sheet disposed on the substrate and including a plurality of holes;
   a fixing means coupling the reflection sheet, the substrate and the housing, and configured to reflect light;
   a plurality of optical receiving parts being formed of an optical fiber and disposed on the reflection sheet so as to detect light from the plurality of light emitting diodes; and
   a plurality of transmission lines disposed on the reflection sheet and configured to transmit light detected at the plurality of optical receiving parts into a color optical receiving sensor,
   wherein the plurality of light emitting diodes are inserted into the plurality of holes of the reflection sheet and a top portion of the plurality of light emitting diodes is protruded from a top surface of the reflection sheet,
   wherein a top portion of the plurality of holes in the reflection sheet has a larger width than an under portion of the plurality of holes,
   wherein the housing includes a slanted side surface and the slanted side surface of the housing is disposed at an outer side of the substrate, the plurality of light emitting diodes and the reflection sheet, so as to reflect light from the plurality of light emitting diodes,
   wherein each of the plurality of light emitting diodes is located at the center of each of the plurality of holes of the reflection sheet, respectively, and a minimum tolerance of a distance between each of the plurality of light emitting diodes and each of the plurality of holes of the reflection sheet, respectively, is equal to 0.001 mm,
   wherein a thickness of the reflection sheet is 50% to 90% of a height of the plurality of light emitting diodes,
   wherein the top portion of each of the plurality of light emitting diodes is formed in a hemisphere shape, and
   wherein each diameter of the plurality of holes at a center region in the reflection sheet is greater than each diameter of the plurality of holes at an outer region in the reflection sheet.

2. The backlight unit according to claim 1, wherein at least one of the plurality of light emitting diodes comprises at least one of a red light emitting diode (LED) chip, a green light emitting diode (LED) chip, and a blue light emitting diode (LED) chip.

3. The backlight unit according to claim 1, wherein a tilt angle of a circumference surface of the at least one of the plurality of holes in the reflection sheet is between 20 and 80°.

4. The backlight unit according to claim 1, wherein a head portion of the fixing means is coated with white color and is protruded from the top surface of the reflection sheet.

5. The backlight unit according to claim 1, wherein the plurality of optical receiving parts and the plurality of transmission-line lines are formed of optical fibers having respectively different diameters.

6. The backlight unit according to claim 1, further comprising at least one optical sheet on the plurality of light emitting diodes and the reflection sheet.

7. The backlight unit according to claim 1, wherein a diameter of one of the plurality of holes in the reflection sheet gradually widens from a bottom toward the top surface of the reflection sheet, and
   a circumference surface of at least one of the plurality of holes in the reflection sheet is a continuous surface.

8. The backlight unit according to claim 1, wherein a reflectivity of a head portion of the fixing means is over 70%.

9. The backlight unit according to claim 1, wherein the plurality of optical receiving parts are spaced apart from the plurality of holes that are inserted with the plurality of light emitting diodes.

10. The backlight unit according to claim 1, wherein one of the plurality of light emitting diodes has a red LED chip, a green LED chip, and a blue LED chip, which are arranged in a clockwise rotation and another of the plurality of light emitting diodes has a red LED chip, a blue LED chip, and a green LED chip, which are arranged in a clockwise rotation.

11. A liquid crystal display apparatus, comprising:
a liquid crystal panel;
an optical sheet under the liquid crystal panel; and
a light unit below the optical sheet,
wherein the light unit comprises:
   a housing;
   a substrate formed in a single piece in the housing;
   a plurality of light emitting diodes on the substrate; and
   a reflection sheet disposed on the substrate and including a plurality of holes;
   a fixing means coupling the reflection sheet, the substrate and the housing, and configured to reflect light;
   a plurality of optical receiving parts being formed of an optical fiber and disposed on the reflection sheet so as to detect light from the plurality of light emitting diodes; and
   a plurality of transmission lines disposed on the reflection sheet and configured to transmit light detected at the plurality of optical receiving parts into a color optical receiving sensor,
   wherein the plurality of light emitting diodes are inserted into the plurality of holes of the reflection sheet and a top potion of at least one of the plurality of light emitting diodes is protruded from a top surface of the reflection sheet,
   wherein a top portion of at least one of the plurality of holes in the reflection sheet has a larger width than an under portion of the at least one of the plurality of holes,
   wherein the housing includes a slanted side surface and the slanted side surface of the housing is disposed at an outer side of the substrate, the plurality of light emitting diodes and the reflection sheet, so as to reflect light from the plurality of light emitting diodes,
   wherein each of the plurality of light emitting diodes is located at the center of each of the plurality of holes of the reflection sheet, respectively, and a minimum tolerance of a distance between each of the plurality of light emitting diodes and each of the plurality of holes of the reflection sheet, respectively, is equal to 0.001 mm,
   wherein a thickness of the reflection sheet is 50% to 90% of a height of the plurality of light emitting diodes,
   wherein the top portion of each of the plurality of light emitting diodes is formed in a hemisphere shape, and
   wherein each diameter of the plurality of holes at a center region in the reflection sheet is greater than each diameter of the plurality of holes at an outer region in the reflection sheet.

12. The liquid crystal display apparatus according to claim 11, wherein a circumference surface of the plurality of holes is slanted 20 to 80° outward with reference to a bottom of the reflection sheet.

\* \* \* \* \*